INVENTOR
ELLEN KERR.
per Norman S. Barlow
attorney

Patented Jan. 11, 1949

2,458,911

UNITED STATES PATENT OFFICE 2,458,911

DEVICE FOR DEPILATORY PURPOSES

Ellen Kerr, Coventry, England

Application July 29, 1947, Serial No. 764,532
In Great Britain August 29, 1944

Section 1, Public Law 690, August 8, 1946
Patent expires August 29, 1964

3 Claims. (Cl. 128—354)

This invention comprises an improved device for depilatory purposes and has for its object to provide a device of this kind in which the hairs are extracted from the skin by means of a coiled spring carried by a holder incorporating means for opening or closing the coils thereof.

In the accompanying drawings.

Figure 1:
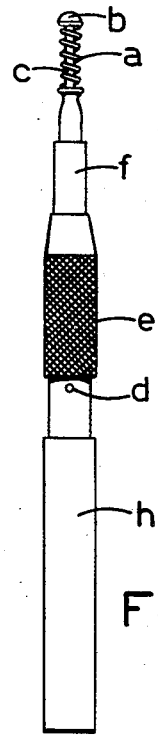
Figure 1 illustrates one form of the improved device in which the spring is in the normally open state shown.
Figure 2:
Figure 2 is a similar view of the same form of device with the spring in its closed state.
Figure 3:
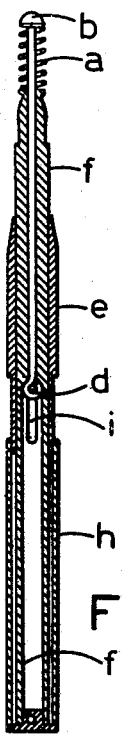
Figure 3 is another view of the same form of device in axial plane section.

In the form of the improved device shown in Figures 1, 2 and 3, that is to say, in the normally open form, the spring $a$ is arranged between a head $b$ on a central rod or pin $c$ attached by means of a transverse pin $d$ to the sliding tubular member $e$ of a telescopic holder and the free end of a member $f$ attached to the relatively stationary member $h$ of said holder. The pin $d$ slides in slots $i$ in the stationary member $f$, the slots being long enough to allow for sufficient movement of the sliding member to fully compress the spring so that any hairs trapped between the coils thereof are firmly held. Exteriorly, the sliding member $e$ is preferably knurled, as shown, to facilitate its operative movement by the fingers with the member $h$ of the holder abutting the palm of the hand. In use the end of the device carrying the spring is pressed against the skin and the sliding member withdrawn towards the stationary member $h$ to compress the spring to grip the hairs and is retained in this position whilst the device is pulled sharply away from the skin.

Figure 4:
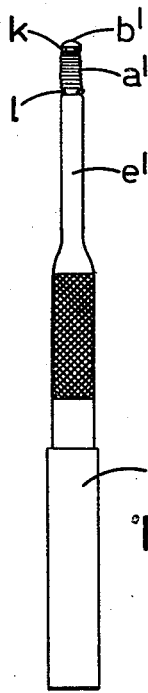
Figures 4, 5 and 6 are views similar to Figures 1, 2 and 3 of another form of the improved device in which the spring is normally in the closed state.
Figure 5:
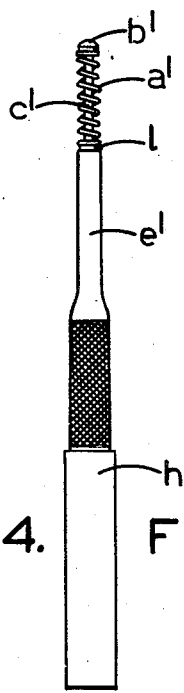
Figure 6:
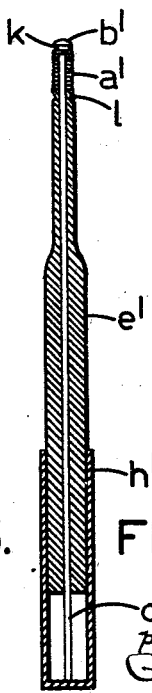

In the alternative form shown in Figures 4, 5 and 6, that is to say, in the normally closed form, the ends of the spring $a^1$ are respectively attached to or engaged with the sliding member $e^1$ of a telescopic holder and a pin $c^1$ attached to the relatively stationary member $h^1$ of said holder. In this case the spring is extended by drawing the sliding member towards the stationary member $h^1$ of the holder, and whilst in this state is pressed against the skin, after which the sliding member $e^1$ is released, whereupon the spring in closing grips the hairs between the coils thereof. As before the operation of the sliding member by the fingers is facilitated by knurling the exterior, as shown. The head $b^1$ of the pin $c^1$ can be formed with a groove $k$ for engagement by one end of the spring and the upper end of the sliding member $e^1$ can be grooved at $l$ for engagement by the other end of the spring.

I claim:

1. Improvements in devices for depilatory purposes comprising in combination a fixed member forming part of the holder for said device, a rod slidably mounted coaxially in said fixed member, a spring member coaxially mounted on said slidable rod and positioned between the top of the fixed member forming part of the holder and the top of the rod and a member connected to said rod which is adapted to be moved in relation to the fixed member forming the holder to operate the spring to grip the hair for removal.

2. Improvements in devices for depilatory purposes comprising in combination, a fixed member forming part of the holder for said device, a rod slidably mounted coaxially in said member, a headed portion on said rod, a spring member coaxially mounted on said slidable rod and positioned between the headed portion thereof and the top of the fixed member forming part of the holder, and a member slidably mounted on the fixed part of the holder to which the slidably mounted rod is connected, so that upon movement of said slidable member on the fixed part of the holder the spring is operated to grip the hair for removal.

3. Improvements in devices for depilatory purposes comprising in combination, a fixed member forming part of the holder for said device, a rod slidably mounted coaxially in said member, a headed portion on said rod, a spring member coaxially mounted on said slidable rod and positioned between the headed portion thereof and the top of the fixed member forming part of the holder, a slot in said fixed part of the holder and a member slidably mounted on said fixed part of the holder which is connected to the slidable rod by means of a pin which passes through the slot in the fixed part of the holder, so that upon movement of said slidable member on the fixed part of the holder the spring is operated to grip the hair for removal.

ELLEN KERR.

REFERENCES CITED

The following references are of record in the file of this patent:

UNITED STATES PATENTS

| Number | Name | Date |
|---|---|---|
| 216,918 | Wales | June 24, 1879 |
| 1,840,369 | Besocke | Jan. 12, 1932 |